UNITED STATES PATENT OFFICE 2,647,074

PRODUCTION OF RIBOFLAVIN BY MICROBIOLOGICAL FERMENTATION

Samuel C. Beesch and Byron W. Fraser, Philadelphia, Pa., assignors to Publicker Industries Inc., Philadelphia, Pa., a corporation of Pennsylvania No Drawing. Application December 16, 1949, Serial No. 133,495

3 Claims. (Cl. 195—35)

The present invention relates to the production of riboflavin by microbiological fermentation and it relates more particularly to the production of riboflavin by the fermentative action of the fungus *Eremothecium ashbyii*.

An object of the present invention is to provide a new and improved process for the production of riboflavin by microbiological fermentation. Another object of the present invention is to provide a novel process for producing riboflavin by the fermentative action of the fungus *Eremothecium ashbyii* employing a new, simple and inexpensive medium or substrate, with much better yields than have heretofore been obtained.

Other objects and advantages of the present invention are apparent in the following detailed description and appended claims.

It has heretofore been suggested that riboflavin is produced by the fermentative action of the fungus *Eremothecium ashbyii*. However, the various media heretofore found necessary to support the growth of the organism have been relatively complicated and expensive and the yields obtained have been relatively low, so that the processes of the prior art have not proven practical from a commercial standpoint.

Thus, in Patent 2,400,710 it has been suggested that riboflavin can be produced by the fermentative action of *Eremothecium ashbyii* upon a medium containing an animal proteinaceous material, a carbohydrate, and a malt extract. The animal proteinaceous materials suggested in this patent are liver, pancreas, spleen, lung, kidney and similar tissues obtained from the slaughter of animals. These materials are far too expensive to permit use of the process in anything but small-scale laboratory experiments. Malt extract, too, is a relatively expensive material which would make the cost of the process prohibitively high, from a commercial standpoint in view of the fact that the riboflavin yields obtained are only 150–500 gamma/ml.

Patent 2,473,817, recognizing the undesirability of water-insoluble animal proteinaceous material in the substrate for the riboflavin-producing fermentation by *Eremothecium ashbyii*, suggests the use of a medium containing a sugar, malt extract, and milk or a milk product containing solubilized casein. The use of casein as the animal proteinaceous substance is claimed to simplify the process and to give somewhat better yields of riboflavin (i. e. 500–600 gamma/ml.). However, the necessity for having malt extract and milk or a milk product again renders the cost of the process prohibitive from a commercial standpoint.

Patent 2,437,818 suggests a medium containing a proteinaceous material, malt extract and a sugar plus glycerides of fatty acids. No specific values are given for riboflavin yield although it is claimed that the addition of the fatty acid glycerides increases the yield by 50–100% over that which would otherwise be the case. Here, again, the cost of the malt extract, fatty acid glycerides, and other materials render the process prohibitively expensive from a commercial standpoint.

Patent 2,483,855 suggests the use of a mash made from the residues of other bacterial fermentations. Here, again, the yields of riboflavin are relatively low; ranging between about 100 and 400 micrograms/ml.

According to the present invention, it has been found, quite unexpectedly, that whole peanut meal, either alone or in conjunction with other relatively inexpensive and readily available materials, such as dextrose and corn steep liquor, can be used as the basis for an aqueous medium capable of being fermented by *Eremothecium ashbyii* with yields of riboflavin far greater than those obtained by conventional methods heretofore employed; namely yields of 1000–1500 micrograms/ml., or more.

The novel process of the present invention does not require expensive malt extracts or animal proteinaceous materials.

Additionally, in the novel process of the present invention, the riboflavin can be recovered by a relatively easy extraction of the crystals of pure riboflavin which separate out by reason of the high yields obtained.

Instead, the entire medium may be evaporated and dried to give a riboflavin-containing food supplement yielding 30,000 to 60,000 micrograms per gram of riboflavin.

Of course, the riboflavin can be extracted from the residue in any of the numerous ways well known in the art.

The following are illustrative, but not restrictive, examples of the process of the present invention.

EXAMPLE 1

Whole ground peanut meal or flour is added to water in order to give a concentration of protein equivalent to 1.29%.

Since the peanut meal or flour in this case analyzes to show approximately 30% protein content, about 4.14% (based on volume) of the ground peanut meal or flour is necessary to obtain 1.29% protein concentration.

By whole peanut meal or flour is meant ground peanuts (which may contain minor amounts of other nuts), usually second-rate or third-rate peanuts; no attempt being made to separate out culls, broken pieces, etc. Peanuts of this nature are usually fed to hogs or other animals and represent an inexpensive source of vegetable protein.

The mixture of ground peanut flour and water is then adjusted to a pH of about 6.0-7.0, and preferably about 6.5, using lime, and then sterilized for about 20 minutes at 15-pound steam pressure.

After sterilization, the mash is cooled and inoculated with 0.05% (based on volume) of an active spore culture of *Eremothecium ashbyii*.

This inoculum is prepared by inoculating a sterilized Sabouraud's medium (10 grams peptone, 10 grams dextrose, 0.01 gram ferrous sulfate per 1000 ml.) with a loop of *Eremothecium ashbyii* from a malt agar slant. The inoculated Sabouraud's medium is then incubated at about 25-30° C. and preferably at about 28° C. for about two days on a shaking machine, operating at a speed of approximately 240 revolutions per minute, in order to maintain aerobic fermentation conditions. The medium is found to be full of active spores of *Eremothecium ashbyii* after two days of incubation.

After inoculation with the active spore culture of *Eremothecium ashbyii*, as mentioned above, the flasks containing the peanut flour mash are placed on a shaking machine operating at a speed of 240 revolutions per minute and allowed to incubate, with agitation, for about 5 days at about 25-30° C. and preferably at approximately 28° C.

The flasks are then analyzed for riboflavin, in any conventional manner.

The results obtained are shown in Table 1, below.

Table 1

| Concentration of Substrate | Percent Protein | Riboflavin, Micrograms/ml. | | | | |
|---|---|---|---|---|---|---|
| | | Flask 1 | Flask 2 | Flask 3 | Flask 4 | Average |
| Whole peanut flour, 4.14% | 1.29 | 620 | 640 | 570 | 670 | 625 |

EXAMPLE 2

The procedure of Example 1 is repeated with varying concentrations of whole peanut flour and with varying amounts of dextrose (in the form of a technical grade which is available under various brand names, such as Cerelose, Clintose, etc.).

The results obtained are shown in Table 2, below.

Table 2

| Concentration of Substrate | Percent Protein | Percent Dextrose | Riboflavin, Micrograms/ml. | | | | |
|---|---|---|---|---|---|---|---|
| | | | Flask 1 | Flask 2 | Flask 3 | Flask 4 | Average |
| Whole peanut flour, 4.14% | 1.29 | 1 | 1,050 | 960 | 800 | 1,200 | 1,002 |
| Whole peanut flour, 6.45% | 2.00 | 2 | 1,360 | 1,320 | 1,100 | 1,280 | 1,265 |
| Whole peanut flour, 8.28% | 2.58 | 1 | 1,100 | 1,160 | 810 | 1,030 | 1,025 |
| Whole peanut flour, 8.28% | 2.58 | 2 | 1,260 | 870 | 980 | 1,300 | 1,102 |

It can be seen that the addition of 1% dextrose to the peanut flour mash employed in Example 1 increased the riboflavin yield by nearly 40% to an average of 1002 micrograms/ml.

When the protein content is doubled, and the dextrose content left at 1%, a slight additional increase in yield results, giving an average of 1025 micrograms/ml.

Doubling of the dextrose content as well (i. e. a protein content of 2.58% and a dextrose content of 2%) gives a further increase in yield to an average of 1102 micrograms/ml. When the protein content is reduced to 2.00% and the dextrose content is left at 2%, a still further increase in riboflavin yield results—the average being 1265 micrograms/ml.

EXAMPLE 3

The procedure of Example 1 is repeated with varying protein and dextrose concentrations and with addition of 1% of corn steep liquor (which is a by-product obtained by the steeping of corn and/or other grains in the preparation of corn sugar).

The results obtained are shown in Table 3, below.

Table 3

| Concentration of Substrate | Percent Protein | Percent Dextrose | Percent Corn Steep Liquor | Riboflavin, micrograms/ml. | | | | |
|---|---|---|---|---|---|---|---|---|
| | | | | Fl. 1 | Fl. 2 | Fl. 3 | Fl. 4 | Aver. |
| Whole peanut flour, 4.14% | 1.29 | 1 | 1 | 970 | 910 | 910 | 1,160 | 987 |
| Whole peanut flour, 8.28% | 2.58 | 1 | 1 | 1,010 | 910 | 900 | 1,540 | 1,090 |
| Whole peanut flour, 8.28% | 2.58 | 2 | 1 | 1,400 | 1,200 | 1,100 | 1,250 | 1,250 |

In the case of 1.29% protein, 1% dextrose and 1% corn steep liquor, the riboflavin yield (987 micrograms/ml.) is about the same as that obtained in Example 2 without the addition of corn steep liquor.

Where the protein content is doubled (2.58%) and the dextrose and corn steep liquor left at 1%, the riboflavin yield (1090 micrograms/ml.) is slightly better than the value (1025 micrograms/ml.) obtained in Example 2 when corn steep liquor is not used.

Where the protein content is 2.58% and the dextrose content is 2%, the addition of 1% corn steep liquor results in a riboflavin yield (1250 micrograms/ml.) substantially greater than that (1102 micrograms/ml.) obtained in Example 2 when no corn steep liquor is employed.

Instead of, or in addition to, shaking the fermenting mash, it is possible to ferment with aeration employing about ⅙–¼, and preferably about ⅕, volume of sterile air per volume of mash per minute.

Various other tests have been run with whole peanut meal or flour concentrations up to about 3% protein and with dextrose concentrations up to about 3% and with corn steep liquor concentrations up to about 2%.

By the novel process of the present invention it is possible to obtain riboflavin yields as high as 1500 micrograms/ml. or more and, in addition, the recovery of the riboflavin is greatly simplified since the pure riboflavin crystals can be readily extracted in ways well known in the art.

Instead of, or in addition to such extraction, the fermented mash can be evaporated and dried to give a final product which has a riboflavin content of about 30,000 to 60,000 micrograms/gram and which can be used as a feed supplement or from which the riboflavin can be extracted in conventional manner.

The novel process of the present invention is of great importance in the art since it provides a commercially feasible method for producing riboflavin on a large scale.

Thus, as pointed out above, all of the ingredients of the mash are inexpensive and readily available materials.

The organism grows actively on the medium without requiring any special controls or adjustment, other than the initial pH adjustment, and the riboflavin is obtained in high yield and easily recoverable form.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described our invention, we claim as new and desire to protect by Letters Patent:

1. A process for the production of riboflavin which comprises forming an aqueous mash consisting essentially of whole peanut flour and a carbohydrate, inoculating the mash with an active culture of *Eremothecium ashbyii*, and fermenting the mash with vigorous agitation.

2. A process for the production of riboflavin which comprises forming an aqueous mash consisting essentially of whole peanut flour in an amount sufficient to make the protein content approximately 1–3% and a carbohydrate, adjusting the pH to about 6–7, inoculating the mash with an active culture of *Eremothecium ashbyii*, and fermenting the mash with vigorous agitation at a temperature of about 25–30° C.

3. A process for the production of riboflavin which comprises forming an aqueous mash consisting essentially of whole peanut flour in an amount sufficient to make the protein content approximately 1–3% and about 1–3% carbohydrate, adjusting the pH to about 6–7, inoculating the mash with an active culture of *Eremothecium ashbyii*, and fermenting the mash with vigorous agitation at a temperature of about 25–30° C.

SAMUEL C. BEESCH.
BYRON W. FRASER.

References Cited in the file of this patent

UNITED STATES PATENTS

| Number | Name | Date |
| --- | --- | --- |
| 2,461,922 | Rake | Feb. 15, 1949 |
| 2,473,818 | Phelps | June 21, 1949 |
| 2,483,855 | Stiles | Oct. 4, 1949 |

OTHER REFERENCES

Winton, Structure and Composition of Foods, vol. I, 1932, p. 497, book 10.1.

Brewer, Jour. Bact., October 1943, p. 395.